United States Patent [19]

Krumel et al.

[11] Patent Number: 4,994,252

[45] Date of Patent: Feb. 19, 1991

[54] REMOVAL OF POTASSIUM CHLORIDE FROM SOLVENTS

[75] Inventors: Karl L. Krumel, Midland, Mich.; Charles A. Wilson, Pittsburg, Calif.; Thad S. Hormel, Midland, Mich.

[73] Assignee: DowElanco, Indianapolis, Ind.

[21] Appl. No.: 478,127

[22] Filed: Feb. 9, 1990

[51] Int. Cl.$^5$ .......................... C01D 3/14; C07C 51/44
[52] U.S. Cl. .................................... 423/499; 423/181; 203/14
[58] Field of Search .................. 423/206 R, 499, 181, 423/182; 203/14, 20, 47, DIG. 25; 546/345

[56] References Cited

U.S. PATENT DOCUMENTS

| | | | |
|---|---|---|---|
| 3,894,035 | 7/1975 | Domenico | 546/291 |
| 3,923,822 | 12/1975 | Domenico | 546/303 |
| 4,050,994 | 9/1977 | Anshus | 203/47 |
| 4,542,221 | 9/1985 | Jones | 546/345 |
| 4,713,231 | 12/1987 | Campbell et al. | 546/345 |
| 4,746,744 | 5/1988 | Wilson et al. | 546/345 |
| 4,793,936 | 12/1988 | Lefrancois et al. | 210/915 |

FOREIGN PATENT DOCUMENTS

| | | | |
|---|---|---|---|
| 2590495 | 5/1987 | France | 210/634 |
| 79810 | 7/1978 | Japan | 210/634 |

Primary Examiner—Jeffrey E. Russel
Assistant Examiner—Brian M. Bolam
Attorney, Agent, or Firm—D. Wendell Osborne

[57] ABSTRACT

Finely divided potassium chloride is removed from mixtures with polar, aprotic solvents, such as N-methyl-2-pyrrolidinone, by combining the mixture with sufficient water to dissolve a significant portion, but not all of the potassium chloride present, removing the added water by distillation, and subsequently separating the larger crystals of the salt that form by filtration or centrifugation. The amount of water employed is in the same general range as the amount of polar, aprotic solvent present.

8 Claims, No Drawings

REMOVAL OF POTASSIUM CHLORIDE FROM SOLVENTS

BACKGROUND OF THE INVENTION

The present invention relates to a process for removing finely divided potassium chloride from a water-soluble polar, aprotic solvent, which process involves the addition and removal of water to increase the particle size of the potassium chloride.

Potassium chloride is formed as a by-product in many chemical processes taking place in polar, aprotic solvents. Examples of such processes include the preparation of esters from acid chlorides and potassium salts of alcohols, phenols or pyridinols, the preparation of ethers by the reaction of aryl or alkyl chlorides with potassium salts of alcohols, phenols, or pyridinols, and the preparation of fluorinated compounds by treatment of chlorinated compounds with potassium fluoride When such reactions are carried out under essentially anhydrous or nearly anhydrous conditions, the potassium chloride that forms is finely divided and is difficult to remove from the solvent by sedimentation, filtration or centrifugation. Unacceptably incomplete removal and/or unacceptably long separation times are typical in such processes when removal by such means is attempted. Further, an unacceptably large amount of the solvent is typically lost in the separation due to entrainment. The separation of potassium chloride from polar, aprotic solvents is sometimes accomplished by distillation of the solvent from the mixture. This method is generally unsatisfactory because the salt that is separated remains in the distillation pot as a difficult-to-handle solid and is contaminated with the other nonvolatile components of the mixture. It generally must be extensively purified before it can be recycled or used in other ways. Since polar, aprotic solvents are generally very soluble in water, it is not usually feasible to simply add sufficient water to dissolve the potassium chloride and then separate the aqueous solution from the solvent by decantation.

An improved process for removing finely divided potassium chloride from mixtures with dipolar, aprotic solvents is, accordingly, of considerable interest.

SUMMARY OF THE INVENTION

It has now been found that finely divided potassium chloride can be readily separated from polar, aprotic solvents by combining mixtures thereof with sufficient water to dissolve a significant portion, but not all of the potassium chloride present, removing the added water by distillation or evaporation, and subsequently removing the salt by a standard procedure, such as sedimentation, filtration, or centrifugation.

The invention includes a process for removing finely divided potassium chloride from a mixture thereof with a polar, aprotic solvent which comprises the consecutive steps of:
(a) combining the mixture with water in an amount between about 60 percent of the weight of the solvent present and the amount necessary to dissolve all of the potassium chloride present,
(b) removing essentially all of the added water by distillation or evaporation, and
(c) separating the potassium chloride by filtration, centrifugation, or sedimentation.

It is generally preferred to combine an amount of water at least about equal in weight to the weight of the solvent.

DETAILED DESCRIPTION OF THE INVENTION

The mixtures of finely divided potassium chloride with a polar, aprotic solvent that are suitable substrates for the present invention generally contain potassium chloride crystals that are less than about 10 micrometers in diameter. They are often less than about 2 micrometers in diameter. Particles of this small size are difficult to separate from liquid diluents by conventional means, such as filtration, centrifugation, or sedimentation because they do not settle well, they blind or go through filters, and they entrain solvent.

The substrate mixtures for the present invention generally contain at least about 5 percent but less than about 60 percent potassium chloride. Mixtures containing between about 10 and about 50 percent potassium chloride are typical. These mixtures, further, contain very little water. Mixtures containing from about 10 parts per million (ppm) to about 10,000 ppm water are typical. Mixtures containing from about 100 ppm to about 5,000 ppm of water are more prevalent.

The present invention is generally applicable to all mixtures containing finely divided potassium chloride and a polar, aprotic solvent regardless of their source. Finely divided potassium chloride mixtures with polar, aprotic solvents are typically obtained in chemical synthesis processes wherein potassium chloride is formed as a by-product of a chemical reaction taking place in an anhydrous or nearly anhydrous polar, aprotic solvent. Examples of such reactions include the preparation of 2,4,6-trifluoro-3,5-dichloropyridine from pentachloropyridine and potassium fluoride in a polar, aprotic solvent, such as N-methyl-2-pyrrolidinone, and the preparation of esters of 4-amino-3,5-dichloro-6-fluoro-2-pyridinyloxyacetic acid from esters of chloroacetic acid and potassium 4-amino-3,5-dichloro-6-fluoro-2-pyridinate in a polar, aprotic solvent, such as N-methyl-2-pyrrolidinone.

The polar, aprotic solvents of the present invention include such solvents as N,N-dimethylformamide, N,N-dimethylacetamide, N-methyl-2-pyrrolidinone, N-cyclohexyl-2-pyrrolidinone, 1,3-dimethyl-2-imidazolidinone, 1,3-dimethyl-3,4,5,6-tetrahydro-2-(1H)pyrimidinone, dimethyl sulfoxide, hexamethylphosphoramide, sulfolane, and the like. Such solvents are generally soluble in water to a considerable degree and are higher boiling than water. They, further, do not dissolve an appreciable amount of potassium chloride. Preferred solvents include N,N-dimethylformamide, N-methyl-2-pyrrolidinone, and dimethyl sulfoxide. The polar, aprotic solvents may contain dissolved substances that do not interfere with the process.

In carrying out the process of the present invention, water is first combined with the potassium chloride-solvent mixture in an amount sufficient to dissolve a significant portion, but not all, of the potassium chloride present. An amount equal to at least about 60 percent by weight of the polar, aprotic solvent is generally sufficient. An amount equal to at least about 80 percent by weight of the polar, aprotic solvent is preferred. The maximum amount that is employed, an amount less than that which will dissolve all of the potassium chloride, is a function of the amount of potassium chloride present, the identity of the polar, aprotic solvent present, and the temperature. It is easily determined by a standard solubility test.

The water is generally combined with the potassium chloride-solvent mixture with good mixing, which is typically accomplished with an agitator. The water is generally added to the mixture, but the mixture can alternatively be added to the water. The combination can be made at any convenient temperature between the freezing and boiling points of water. Typically, it is made at temperatures between about 20° C. and about 90° C. and preferably between about 25° C. and about 80° C. The combination can be made at any convenient pressure. Generally, pressures between about 10 kiloPascals (kPa) and about 3,500 kPa are employed. Pressures of about 50 kPa and about 500 kPa are preferred. It is often convenient to operate at atmospheric pressure or at a pressure slightly above atmospheric. It is at other times preferred to operate at pressures somewhat below atmospheric pressure to facilitate the later removal of water.

The admixture of water and the potassium chloride-solvent mixture obtained can be held for a period or can be taken to the next step of the process immediately. Acceptable holding periods can range from a few minutes to several days. Generally, holding periods of a few minutes to a few hours are employed. If the mixture is held for long periods, it is preferred to allow it to cool to ambient temperatures. Many of the solvents will decompose to some extent when the admixtures are held for a long period at higher temperatures.

Water is next removed from the admixture by evaporation, distillation, or by other processes that involve vaporization of the water. Typically, the water is removed by distillation. The distillation can be carried out at any convenient pressure. Generally, pressures of about 1 kPa to about 500 kPa are employed. It is often preferred to operate at pressures somewhat below atmospheric pressure to facilitate the distillation and to avoid higher temperatures. A distillation apparatus with at least one theoretical plate of separation is generally employed. Good, but not excessive, mixing is generally maintained in the admixture during the removal of water in order to maintain homogeneity.

Essentially all of the water that was combined with the original mixture of finely divided potassium chloride and polar, aprotic solvent is removed in this step of the process. Generally, the amount of water remaining in the mixture after the removal will be between about 10 parts per million (ppm) to about 10,000 ppm. The amount of water remaining is preferably below about 1,000 ppm and more preferably below about 500 ppm.

When essentially all of the water that was combined with the original mixture of finely divided potassium chloride and polar, aprotic solvent has been removed, the potassium chloride is present in the form of crystals that are large enough to be readily separated from the solvent by conventional means. These crystals average at least about 20 micrometers (um) in diameter, preferably at least about 100 um, and more preferably at least about 200 um. Particles up to about 1 millimeter (mm) in diameter are often obtained. Particles of this size and larger are known to be amenable to recovery by conventional techniques, such as filtration, centrifugation, and sedimentation.

No special equipment or operational limitations are involved in the separation of the insoluble, crystalline potassium chloride obtained in the process when conventional methods, such as filtration, centrifugation, or sedimentation, are employed. Preferably, the separation is made by filtration or centrifugation.

The potassium chloride removed from the mixtures is generally relatively pure material and can be utilized in most applications known for potassium chloride. It can be further dried, if desired, or can be dissolved in water, if desired, before use.

The following Examples serve to illustrate the invention. They should not be construed as limiting.

EXAMPLES

Example 1. Crystal Size Enhancement in N-Methyl-2-pyrrolidinone with Water

A potassium chloride suspension in N-methyl-2-pyrrolidinone which was obtained as the by-product of a reaction of potassium fluoride with a polychloropyridine was employed. The contained potassium chloride was found by scanning electron microscopy to be present as crystals between 1 and 10 um in diameter with most of the crystals being in the 1-2 um diameter range. The mixture was further found to contain about 750 ppm water as determined by Karl Fischer titration. A 184.1 grams (g) aliquot of the suspension was diluted with 77.3 g of additional N-methyl-2-pyrrolidinone to obtain a slurry containing about 15 percent potassium chloride and weighing about 261.4 g. A 148.3 g portion of water was added to this with stirring at ambient temperature and atmospheric pressure in a flask equipped with a stirrer, thermometer, and distillation head. This amount of water is 67 percent of the solvent by weight. After about 1 hour stirring the pressure was adjusted to about 85 mm Hg (11 kPa) and the water was removed by distillation until the pot temperature and the head temperature were within about 8° C. of each other. This treatment removes water to less than about 200 ppm. The solids present were recovered by filtration, washed with acetone, and air dried. The filtration was facile. The crystal sizes were then measured as before and found to be on average in the 20-40 um range. Some agglomerates in the range of 100-130 um were also present. Crystals in the 0.5 to 1 mm range diameter were obtained when an equivalent experiment was conducted employing an amount of water equal to the amount of N-methyl-2-pyrrolidinone present.

Example 2. Filtration of Potassium Chloride Before and After Treatment

A 3.81 kilogram (kg) sample of a 22 percent slurry of finely divided (average particle diameter about 1-2 um) potassium chloride in N-methyl-2-pyrrolidinone (about 0.84 kg of potassium chloride and 2.97 kg of the solvent) obtained from the reaction of potassium fluoride with pentachloropyridine in was obtained. This was placed a 12 liter vessel equipped with a mechanical stirrer and 7.68 kg of a solution consisting of about 0.20 kg of potassium chloride, 2.26 kg of N-methyl-2-pyrrolidinone, and 5.22 kg of water was added. A slurry containing a total of 1.04 kg of potassium chloride, 5.23 kg of N-methyl-2-pyrrolidinone, and 5.22 kg of water (100 percent as much water as N-methyl-2-pyrrolidinone) was obtained. The mixture was stirred for 1 hr and was then heated to 77° C. at 130 mm Hg (17 kPa) pressure. Water was removed by distillation through a 5 centimeter (cm) Oldershaw column until the pot temperature was 146° C. and the head temperature was constant at 140° C. The slurry of potassium chloride with enlarged crystals (average particle diameter about 0.5-0.7 mm) obtained contained about 105 ppm water as determined by Karl Fischer titration. Samples of the initially obtained finely divided and the enlarged crystal potassium chloride in N-methyl-2-pyrrolidinone slurries were placed in individual 12 cm diameter, 70 micron porosity sintered polyethylene filters fitted on filter flasks so that a 5 cm bed of solid potassium chloride was formed with 3 cm of liquid above it. The pressure in the filter flasks was reduced by means of a water aspirator and the liquid was allowed to drain from the mixture. The time required to do so was measured. The filter cakes were washed with 500 milliliters of fresh N-methyl-2-pyrrolidinone and the time required for this to drain from the cake was also recorded. The resulting solids were analyzed for N-methyl-2-pyrrolidinone and other volatile components by thermal gravimetric analysis. A total of 1.03 kg of enlarged crystal potassium chloride was recovered. The results are given in the following table.

| Sample | Drain Time, sec. | Wash Time, sec. | Volatiles, percent |
| --- | --- | --- | --- |
| finely divided | 54 | 108 | 67 |
| treated | 9 | <15 | 17 |

What is claimed is:

1. A process for removing particles of potassium chloride from a mixture thereof with a polar, aprotic solvent which comprises the consecutive steps of:
   (a) combining the mixture with water in an amount between about 60 percent of the weight of the solvent present and the amount necessary to dissolve all of the potassium chloride present,
   (b) removing essentially all of the added water by distillation or evaporation, so that the potassium chloride is present in the form of crystals large enough to be separated, and
   (c) separating the potassium chloride by filtration, centrifugation, or sedimentation.
2. A process according to claim 1 wherein an amount of water at least about 80 percent of the weight of the solvent is combined.
3. A process according to claim 1 wherein the added water is removed by distillation.
4. A process according to claim 3 wherein the water is removed to less than about 1,000 ppm.
5. A process according to claim 1 wherein the potassium chloride is removed by filtration or centrifugation.
6. A process according to claim 1 wherein the initial mixture contains particles of potassium chloride.
7. A process according to claim 1 wherein the polar, aprotic solvent is N,N-dimethylformamide, N-methyl-2-pyrrolidinone, or dimethyl sulfoxide.
8. A process according to claim 7 wherein the solvent is N-methyl-2-pyrrolidinone.

* * * * *

UNITED STATES PATENT AND TRADEMARK OFFICE
CERTIFICATE OF CORRECTION

PATENT NO. : 4,994,252

DATED : February 19, 1991

INVENTOR(S) : Karl L. Krumel et al.

It is certified that error appears in the above-identified patent and that said Letters Patent is hereby corrected as shown below:

Col. 6, line 24, after "contains" insert -- at least 5 percent --.

Signed and Sealed this

Twenty-fifth Day of August, 1992

*Attest:*

DOUGLAS B. COMER

*Attesting Officer*      *Acting Commissioner of Patents and Trademarks*